United States Patent [19]

Jee

[11] Patent Number: 5,168,592

[45] Date of Patent: Dec. 8, 1992

[54] MULTIPURPOSE PLIERS

[76] Inventor: Beam-Che Jee, No. 2, Lane 28, Kuang Hwa St., Panchiao City, Taipei Hsien, Taiwan

[21] Appl. No.: 805,653

[22] Filed: Dec. 12, 1991

[51] Int. Cl.$^5$ ............................................. B25F 1/00
[52] U.S. Cl. ........................................ 7/107; 7/132; 81/9.4
[58] Field of Search .................. 7/107, 125, 132, 158; 81/355, 361, 362, 9.4; 30/90.1; 140/106

[56] References Cited

U.S. PATENT DOCUMENTS

| | | | |
|---|---|---|---|
| 4,225,990 | 10/1980 | Theiler | 7/107 |
| 4,571,764 | 2/1986 | Chen et al. | 7/107 |
| 4,660,241 | 4/1987 | Chen et al. | 7/107 |
| 4,677,702 | 7/1987 | Cairns | 7/107 |
| 4,713,874 | 12/1987 | Schwartz | 7/107 X |

Primary Examiner—James G. Smith

[57] ABSTRACT

For cutting, stripping and gripping three-phase cable connectors, a multipurpose pliers comprising two pivoted handles, a shearing blade fastened in either handle, two insulation-stripping cutters fastened in said two pivoted handles respectively, a pressure plate controlled by said two pivoted handles to move in a frame, a folding connection and two torsion springs fastened in said two pivoted handles between said clamping device to control the relative rotation of said two pivoted handles, wherein said frame has three holes in different size for inserting different cable connectors; said pressure plate has three teeth in different size driven by the two pivoted handles to respectively insert toward the three holes in said frame for gripping operation.

1 Claim, 4 Drawing Sheets

MULTIPURPOSE PLIERS

BACKGROUND AND SUMMARY OF THE INVENTION

The present invention relates to pliers and relates more particularly to such a multipurpose pliers which is practical for use in fastening a three-phase cable connector and can be used to perform gripping, cutting and insulation-stripping operations.

Conventionally, a pliers is designed for gripping small objects, bending wires or for any specific purpose. In fastening a three-phase cable to a cable connector, a cutting pliers, an insulation-stripping pliers and a vice pliers may be simultaneously used. The present invention has been accomplished to combine a cutting pliers, an insulation-stripping pliers and a vice pliers into a piece. By means of torsion springs and folding connections, squeezing two pivoted handles inward causes a pressure plate to press against a frame so that gripping operation is done. Shearing blade and insulation-stripping cutters are fastened in the two pivoted handles for cutting off cables and stripping off insulations. Different teeth are made on the pressure plate for gripping cables and cable connectors of different specifications.

DETAILED DESCRIPTION OF THE PREFERRED EMBODIMENT

Figure 1:
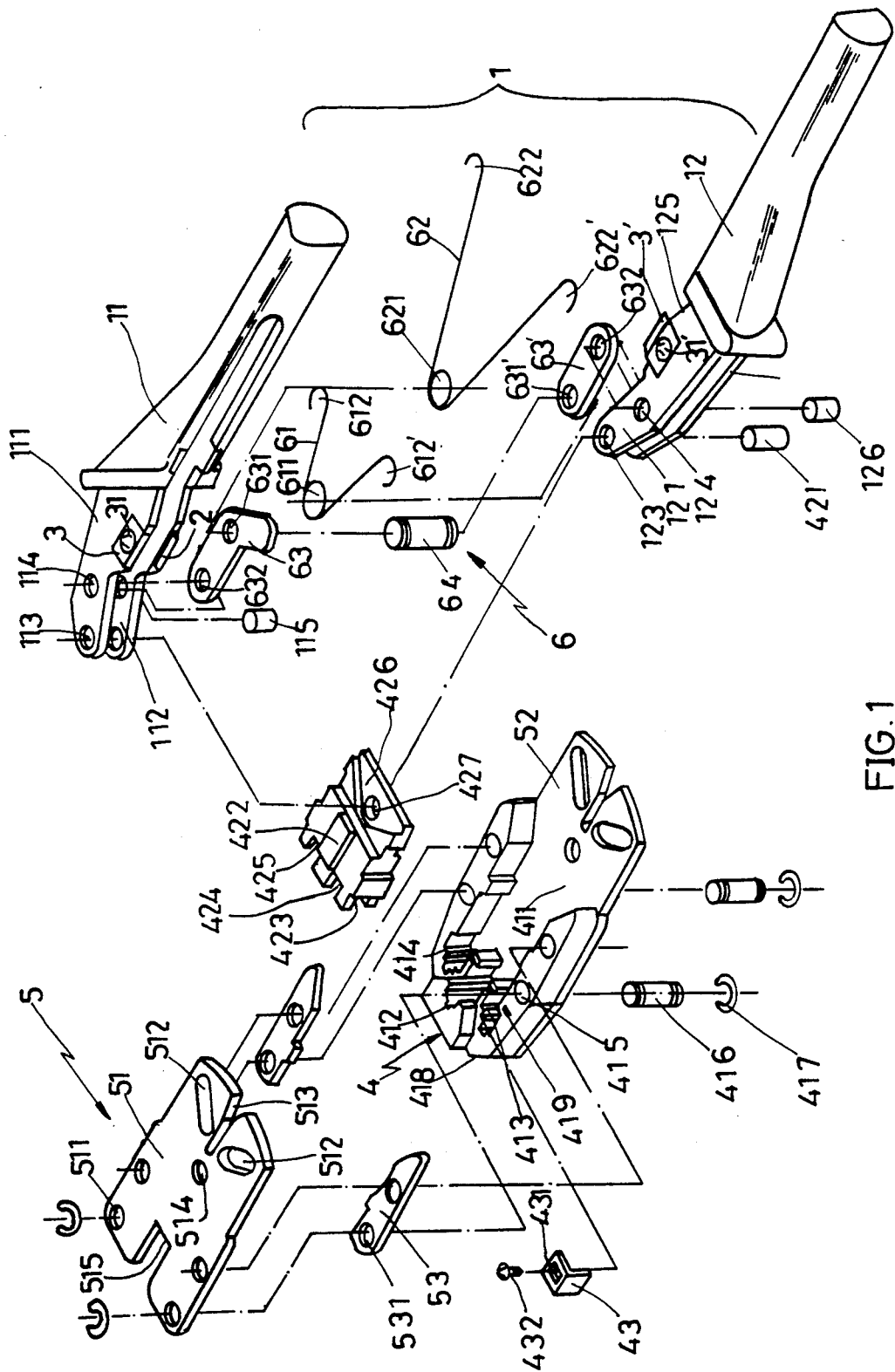
FIG. 1 is an exploded perspective view of the preferred embodiment of the pliers of the present invention.
Figure 2:
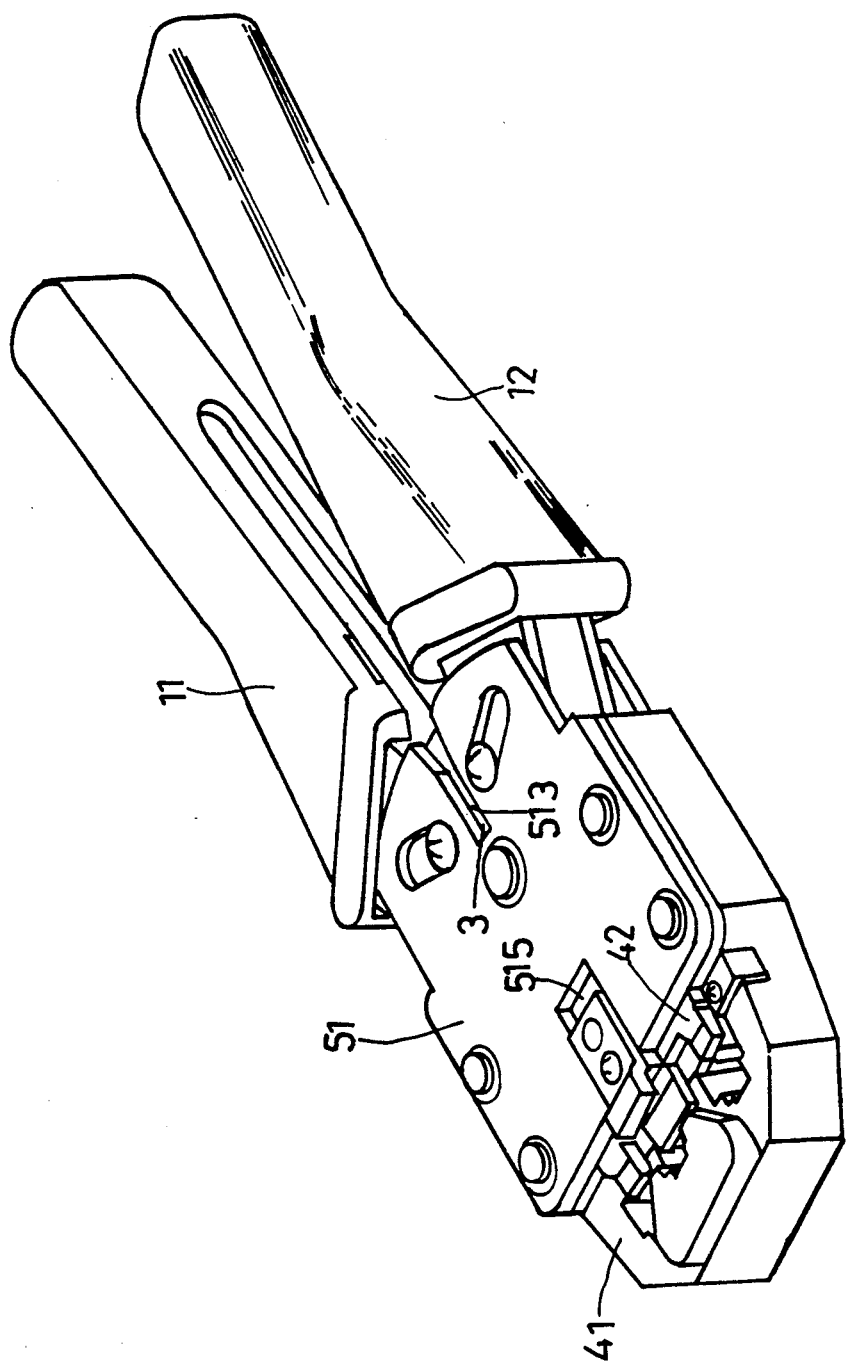
FIG. 2 is a perspective view thereof.
Figure 3:
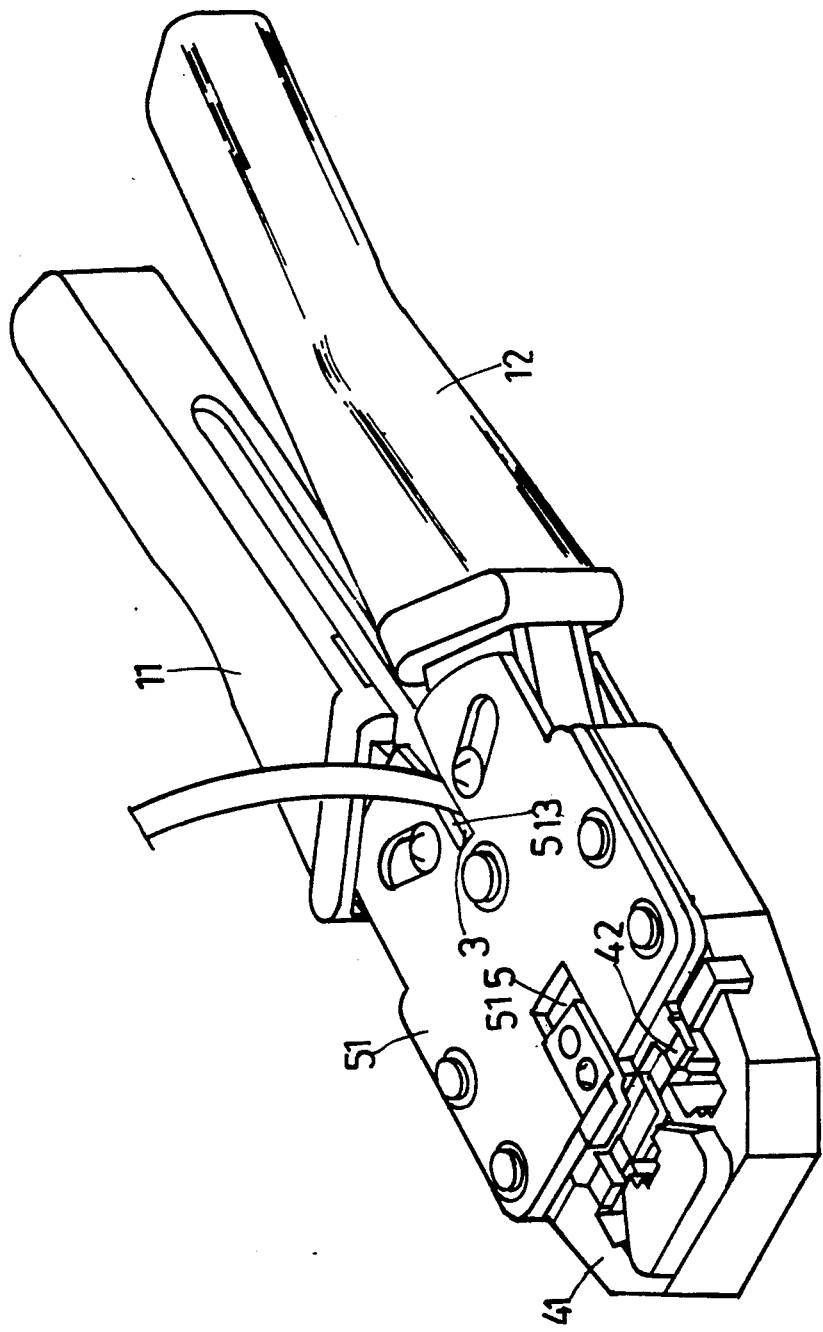
FIG. 3 illustrates the operation of the present invention in stripping off a cable's insulation.
Figure 4:
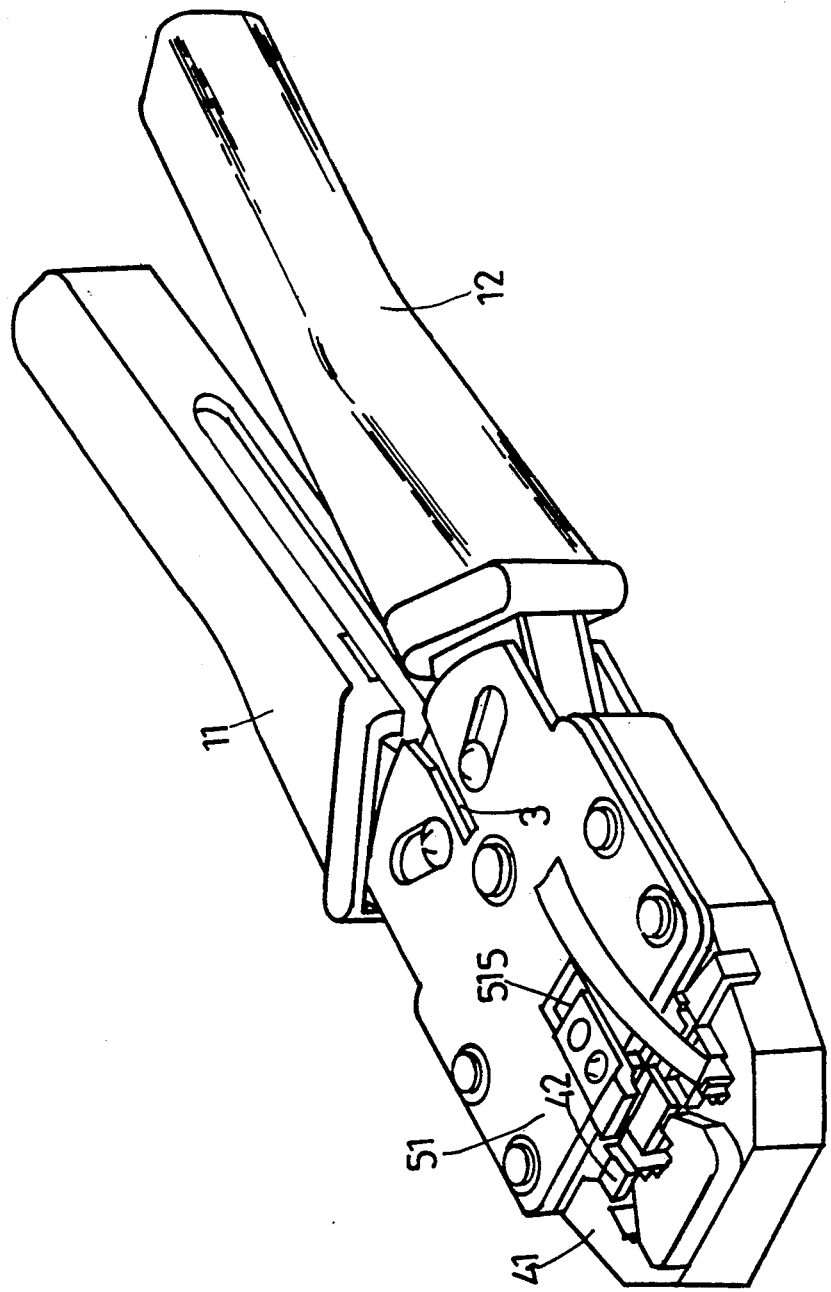
FIG. 4 illustrates the operation of the present invention in gripping conductors together.

Referring to the annexed drawings in greater detail, therein illustrated is the preferred embodiment of the pliers of the present invention which is generally comprised of a pliers body 1, a shearing blade 2, two insulation-stripping cutters 3, 3′, a clamping unit 4, a cover unit 5, and control elements 6.

The pliers body 1 is comprised of two pivoted handles, namely, a right-hand handle 11 and a left-hand handle 12. The right-hand handle 11 is comprised of an upper casing 111 and a lower casing 112, having two round holes 113, 114 respectively aligned. The upper casing 111 is fixedly attached with an insulation-stripping cutter 3 while the lower casing 112 is fixedly attached with a shearing blade 2. By fastening a pin 421 into the round holes 113 on the upper and lower casings 111, 112, a pressure plate 42 and the left-hand handle 12 are pivoted together. By fastening a pin 115 into the round holes 114 on the upper and lower casings 111, 112, the upper and lower casings 111, 112 are secured together. The left-hand handle 12 is also comprised of an upper casing 121 and a lower casing 122. The upper and lower casings 121, 122 each has two round holes 123, 124 respectively aligned with each other. The upper casing 121 is fixedly attached with an insulation-stripping cutter 3′ while the lower casing 122 is fixedly attached with a scale plate 125. The round holes 123 on the upper and lower casings 121, 122 of the left-hand handle 12 are provided for inserting the pin 421 so that the left-hand handle 12 is pivotably secured to the right-hand handle 11 and the pressure plate 42. By inserting a pin 126 into the round holes 124, the upper and lower casings 121, 122 are secured together. By moving the shearing blade 2 toward the scale plate 125, the pliers is used to cut off cables. Further, the scale plate 125 can also be used for measuring the length of a cable's insulation to be stripped off.

The shearing blade 2 is fixedly fastened in lower casing 112 of the right-hand handle 11 at an inner side and moved against the scale plate 125 for cutting off cables.

The insulation-stripping cutters 3 and 3′ are respectively fastened in the upper casings 111, 121 of the right-hand and left-hand handles 11, 12 for stripping off the insulation of the cable inserted therein.

The clamping unit 4 comprises a frame 41, a pressure plate 42, and a clamping plate 43. The frame 41 defines a space 411 therein for moving the pressure plate 42, and comprises three holes 412, 413, 414 inside said space 411 for inserting different cable connectors, a plurality of round holes 415 at two opposite sides for fastening an upper cover plate 51 at the top and a lower cover plate 52 at the bottom by pins and C-shaped retainer rings 417, and a locating groove 419 at one side for fastening the clamping plate 43. The pressure plate 42 has a unitary raised block 422 at the top, three teeth 423, 424, 425 at one end for gripping cables of different specifications, a V-shaped groove 426 at an opposite end, and a round hole 427 on said V-shaped groove 426. By engaging the raised block 422 into a notch 515 on the upper cover plate 51, the right-hand and left-hand handles 11, 12 are confined to alternatively move against each other within a fixed range. During assembly process, the upper casings 111, 121 of the handles 11, 12 are respectively inserted into the V-shaped groove 426 with the round holes 427, 113, 123 aligned and secured by the pin 421. The clamping plate 43 has a locating hole 431 fastened in the locating groove 419 of the frame 41 by a screw 423. The clamping plate 43 may be fixed in the locating groove 419 and adjusted closer to or far from the hole 413 according to the size of the cable connector inserted in the hole 413 for processing. Therefore, the tolerance of the hole 413 is adjusted by changing the position of the clamping plate 43 in the locating groove 419.

The cover unit 5 is comprised of an upper cover plate 51, a lower cover plate 52, and a cushion 53. The upper cover plate 51 has a plurality of round holes 511 at two opposite sides, two sliding grooves 512, 512′ at one end, a rear notch 513 between said two sliding grooves 512, 512′, a round hole 514 at the middle, and a front notch 515 at an opposite end. The round holes 511 are respectively aligned with the round holes 415 on the frame 41 and secured thereto by pins 416 and C-shaped retainer rings 417. The sliding grooves 512, 512′ are provided for the sliding therein of the screws 31, 31′ which are fastened in the handles 11, 12 to secure the insulation-stripping cutters 3, 3′. The rear notch 513 is provided for inserting a cable to be stripped. The round hole 514 is for fastening the lower cover plate 52, two torsion springs 61, 62 and a connection 63 by a pin 64. The front notch 515 is provided for inserting the raised block 422 of the pressure plate 42. The lower cover plate 52 has a structure similar to the upper cover plate 51, however, it does not have the front notch 515 on the upper cover plate 51. Further, the lower cover plate 52 has one end disposed in flush with the front edge 418 of the frame 41. The cushion 53 has a plurality of round holes 531 respectively aligned with the round holes 511 on the upper cover plate 51 and the round holes 415 on the frame 41 and secured between the upper cover plate 51 and the frame 41 by pins 416 and C-shaped retainer rings 417.

The control elements 6 comprise two torsion springs 61, 62 two connections 63, 63', and a pin 64. The connections 63, 63' each has two round holes 631, 632; 631', 632'. The torsion springs 61, 62 each has a loop 611 or 621 at the middle and two hooked ends 612, 612'; 622, 622' at two opposite ends. By inserting the pin 64 through the loops 611, 621 of the torsion springs 61, 62, the round holes 631, 631' on the connections 63, 63' and the round holes 514 on the upper and lower cover plates 51, 52, the upper and lower cover plates 51, 52, the torsion springs 61, 62 and the connections 63, 63' are connected together. The two opposite hooked ends 612, 612' of the first torsion spring 61 are respectively hooked on the pin 115 which is fastened in the round holes 114 on right-hand handle 11, and the pin 126 which is fastened in the round holes 124 on the left-hand handle 12. The two opposite hooked ends 622, 622' of the second torsion spring 62 are respectively hooked on the two screws 31, 31' which are fastened in the handles 11, 12 to secure the insulation-stripping cutters 3, 3'. The other round hole 632 of the first connection 63 is secured to the pin 115 while the other round hole 632' of the second connection 63' is secured to the pin 126.

When the two handles 11, 12 are squeezed against each other, the torsion springs 61, 62 and the connections 63, 63 cause the two handles 11, 12 to move forward relative to the upper and lower cover plates 51, 52. At the same time, the pressure plate 42 is pushed by the handles 11, 12 to move in the space 411 for cutting, insulation-stripping or gripping operation. Once external pressure is released from the handles 11, 12, the torsion springs 61, 62 automatically push the handles 11, 12 move back to their original positions.

What is claimed is:

1. A pliers for gripping, cutting and insulation-stripping operations, the improvement comprising:

a right-hand handle and a left-hand handle pivoted to each other, each of which being comprised of an upper casing and a lower casing and having a first pivot hole and a second pivot hole through said upper and lower casings, the upper casing of said right-hand handle being fixedly attached with a first insulation-stripping cutter by a first screw, the lower casing of said right-hand handle being fixedly attached with a shearing blade by said first screw, the first pivot hole on said right-hand handle being fastened with a first pin, the first pivot hole on said left-hand handle being fastened with a second pin, the upper casing of said left-hand handle being fixedly attached with a second insulation-stripping cutter by a second screw at a location corresponding to said first insulation-stripping cutter, the lower casing of said left-hand handle being fixedly attached with a scale plate by said second screw at a location corresponding to said shearing blade;

a clamping unit movably connected to said right-hand and left-hand handles at one end, said clamping unit comprising a frame, a pressure plate and a clamping plate, said frame defining a space therein for moving said pressure plate in longitudinal direction and comprising three holes inside said space at one end for inserting different cable connectors, and a locating groove at one side for fastening said clamping plate, said pressure plate having a unitary raised block at the top, three teeth at one end for gripping cables of different specifications, a V-shaped groove at an opposite end, and a round hole on said V-shaped groove secured to the second pivot holes on said right-hand and left-hand handles by a third pin;

an upper cover plate covered on said frame at the top, said upper cover plate comprising two sliding grooves for moving said first and second screws respectively, a first notch at one end for inserting a cable to be stripped, a second notch at an opposite end for inserting said raised block of said pressure plate, and a round hole at the middle;

a cushion fastened between said upper cover plate and said frame;

a lower cover plate covered on said frame at the bottom, said lower cover plate comprising two sliding grooves and a rear notch corresponding to the sliding grooves and the rear notch on said upper cover plate, and a round hole at the middle connected to the round hole on said upper cover plate by a fourth pin;

a first torsion spring, said first torsion spring comprising a loop at the middle mounted on said fourth pin and two hooked portions at two opposite ends respectively hooked on said first and second pins;

a second torsion spring, said second torsion spring comprising a loop at the middle mounted on said fourth pin and two hooked portions at two opposite ends respectively hooked on said first and second screws;

a first connection, said first connection having two pivot holes at two opposite ends respectively mounted on said first pin and said fourth pin; and a second connection, said second connection having two pivot holes at two opposite ends respectively mounted on said second pin and said fourth pin.

* * * * *